United States Patent
Tasker et al.

(10) Patent No.: US 7,852,783 B2
(45) Date of Patent: Dec. 14, 2010

(54) IDENTIFY A SECURE END-TO-END VOICE CALL

(75) Inventors: Michael Edric Tasker, Pleasanton, CA (US); Hosahalli Nanjappa Narendra, San Jose, CA (US); Parameswaran Kumarasamy, San Jose, CA (US); Sandeep Singh Kohli, Fremont, CA (US); Kavithadevi Parameswaran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 443 days.

(21) Appl. No.: 11/608,217

(22) Filed: Dec. 7, 2006

(65) Prior Publication Data

US 2008/0141331 A1 Jun. 12, 2008

(51) Int. Cl.
*H04L 12/26* (2006.01)
(52) U.S. Cl. .................. 370/252; 370/389; 370/392; 370/465
(58) Field of Classification Search ......... 380/250–280; 370/230, 352, 395.2, 355, 389, 260, 252; 709/221, 220, 224, 228, 231
See application file for complete search history.

(56) References Cited

U.S. PATENT DOCUMENTS

| | | |
|---|---|---|
| 3,963,874 A | 6/1976 | Pommerening et al. |
| 4,809,321 A | 2/1989 | Morganstein et al. |
| 5,134,610 A | 7/1992 | Shand et al. |
| 5,526,416 A | 6/1996 | Dezonno et al. |
| 5,649,105 A | 7/1997 | Aldred et al. |
| 5,724,420 A | 3/1998 | Torgrim |
| 5,742,905 A | 4/1998 | Pepe et al. |
| 5,940,591 A | 8/1999 | Boyle et al. |
| 5,991,645 A | 11/1999 | Yuen et al. |
| 6,295,354 B1 | 9/2001 | Dezonno |
| 6,301,339 B1 | 10/2001 | Staples et al. |
| 6,353,886 B1 | 3/2002 | Howard et al. |
| 6,463,471 B1 | 10/2002 | Dreke et al. |
| 6,501,750 B1 | 12/2002 | Shaffer et al. |

(Continued)

OTHER PUBLICATIONS

NPL Document: RFC 3711—The Secure Real-time Transport Protocol (SRTP), published Mar. 2004, by the Network Working Group. See whole Document.*

(Continued)

*Primary Examiner*—Michael J Moore, Jr.
(74) *Attorney, Agent, or Firm*—Stolowitz Ford Cowger LLP

(57) ABSTRACT

We describe a system embodiment comprising generating a Secure Real-Time Transport Protocol (SRTP) encapsulated packet and including a secure media indicator into the SRTP encapsulated packet. The method further comprises inserting the SRTP encapsulated packet into an SRTP voice stream associated with an active call between a source and a destination endpoint and indicating an end-to-end secure call between the source and destination endpoints responsive to the secure media indicator.

And we describe a method embodiment comprising transmitting a request message from a source endpoint to a destination endpoint participating in an active call and setting a secure media flag in the request message at each node in a signaling path associated with the active call. The method further comprises returning a response message from the destination endpoint to the source endpoint responsive to the request and indicating an end-to-end secure call between the two endpoints.

9 Claims, 6 Drawing Sheets

U.S. PATENT DOCUMENTS

| | | | |
|---|---|---|---|
| 6,510,162 B1 | 1/2003 | Fijolek et al. | |
| 6,546,087 B2 | 4/2003 | Shaffer et al. | |
| 6,546,097 B1 | 4/2003 | Peltz | |
| 6,567,505 B1 | 5/2003 | Omori et al. | |
| 6,697,462 B2 | 2/2004 | Raymond | |
| 6,748,543 B1 | 6/2004 | Vilhuber | |
| 6,751,463 B1 | 6/2004 | Lorello et al. | |
| 6,754,712 B1 | 6/2004 | Valencia | |
| 6,757,722 B2 | 6/2004 | Lonnfors et al. | |
| 6,760,322 B1 | 7/2004 | Fukuda et al. | |
| 6,766,165 B2 | 7/2004 | Sharma et al. | |
| 6,785,266 B2 | 8/2004 | Swartz | |
| 6,788,779 B2 | 9/2004 | Ostapchuck | |
| 6,807,423 B1 | 10/2004 | Armstrong et al. | |
| 6,853,634 B1 | 2/2005 | Davies et al. | |
| 6,928,473 B1 | 8/2005 | Sundaram et al. | |
| 6,930,983 B2 | 8/2005 | Perkins et al. | |
| 7,010,292 B2 | 3/2006 | Jerbi et al. | |
| 7,039,713 B1 | 5/2006 | Van Gunter et al. | |
| 7,042,988 B2 | 5/2006 | Juitt et al. | |
| 7,043,643 B1 | 5/2006 | Doe et al. | |
| 7,043,753 B2 | 5/2006 | Roddy et al. | |
| 7,058,387 B2 | 6/2006 | Kumar et al. | |
| 7,062,563 B1 | 6/2006 | Lewis et al. | |
| 7,149,801 B2 | 12/2006 | Burrows et al. | |
| 7,242,421 B2 | 7/2007 | Center, Jr. et al. | |
| 7,260,632 B2 | 8/2007 | Shaffer et al. | |
| 7,308,101 B2* | 12/2007 | Wing | 380/257 |
| 7,379,461 B2 | 5/2008 | Wu et al. | |
| 7,418,736 B2 | 8/2008 | Ghanea-Hercock | |
| 7,464,267 B2* | 12/2008 | Zhu et al. | 713/168 |
| 7,570,765 B1* | 8/2009 | Eslambolchizadeh | 380/257 |
| 7,746,853 B2* | 6/2010 | Zhang | 370/389 |
| 2001/0042202 A1 | 11/2001 | Horvath et al. | |
| 2002/0019853 A1 | 2/2002 | Vange et al. | |
| 2002/0024947 A1 | 2/2002 | Luzzatti et al. | |
| 2002/0150041 A1 | 10/2002 | Reinshmidt et al. | |
| 2002/0172365 A1 | 11/2002 | Nakagomi et al. | |
| 2002/0181394 A1 | 12/2002 | Partain et al. | |
| 2003/0107991 A1 | 6/2003 | Tezuka et al. | |
| 2003/0225549 A1 | 12/2003 | Shay et al. | |
| 2004/0034793 A1 | 2/2004 | Yuan | |
| 2004/0071084 A1 | 4/2004 | El-Hennawey et al. | |
| 2004/0117500 A1* | 6/2004 | Lindholm et al. | 709/231 |
| 2004/0249910 A1 | 12/2004 | Jerbi et al. | |
| 2005/0022180 A1 | 1/2005 | Couturier | |
| 2005/0066033 A1 | 3/2005 | Cheston et al. | |
| 2005/0075842 A1 | 4/2005 | Ornazabal et al. | |
| 2005/0083912 A1 | 4/2005 | Afshar et al. | |
| 2005/0086495 A1 | 4/2005 | Sheth et al. | |
| 2005/0094623 A1* | 5/2005 | D'Eletto | 370/352 |
| 2005/0108746 A1* | 5/2005 | Futagami et al. | 725/31 |
| 2005/0188194 A1 | 8/2005 | Fascenda | |
| 2005/0210148 A1 | 9/2005 | Kato et al. | |
| 2005/0228895 A1 | 10/2005 | Karunamurthy et al. | |
| 2005/0232184 A1 | 10/2005 | Borella | |
| 2005/0246282 A1* | 11/2005 | Naslund et al. | 705/52 |
| 2005/0254656 A1* | 11/2005 | Rose et al. | 380/277 |
| 2005/0262195 A1 | 11/2005 | Ono et al. | |
| 2005/0265349 A1* | 12/2005 | Garg et al. | 370/395.2 |
| 2005/0283837 A1 | 12/2005 | Olivier et al. | |
| 2006/0041936 A1 | 2/2006 | Anderson et al. | |
| 2006/0047782 A1 | 3/2006 | Niemi | |
| 2006/0070003 A1 | 3/2006 | Thompson et al. | |
| 2006/0095560 A1 | 5/2006 | Wu et al. | |
| 2006/0130127 A1 | 6/2006 | Kaler et al. | |
| 2006/0167991 A1 | 7/2006 | Heikes et al. | |
| 2006/0215633 A1 | 9/2006 | Jennings et al. | |
| 2006/0218399 A1* | 9/2006 | FitzGerald et al. | 713/168 |
| 2006/0253458 A1 | 11/2006 | Dixon et al. | |
| 2006/0256731 A1 | 11/2006 | Jennings et al. | |
| 2006/0258332 A1 | 11/2006 | Jennings et al. | |
| 2006/0259958 A1 | 11/2006 | Jennings et al. | |
| 2007/0036143 A1* | 2/2007 | Alt et al. | 370/352 |
| 2007/0109978 A1* | 5/2007 | Miriyala et al. | 370/260 |
| 2007/0237145 A1* | 10/2007 | Adhikari et al. | 370/392 |

OTHER PUBLICATIONS

NPL Document: RFC2527—Internet X.509 Public Key Infrastructure Certificate, published Mar. 1999 by the Network Working Group. See whole Document.*

SRTP (Secure RTP); Elisabetta Carrara; Aug. 2001; Website: http://www.3.ietf.org/proceedings/01aug/slides/avt-2/sld001.htm; pp. 1-17.

Network Working Group, RTP Payload for DTMF Digits, Telephony Tones and Telephony Signals; H. Schulzrine et al.; May 2000; Website: http://www.rfc-editor.org/rfc/rfc2833.txt; pp. 1-27.

Network Working Group, Security Architecture for the Internet Protocol; S. Kent et al.; Nov. 1998; Website: http://www.rfc-editor.org/rfc/rfc2401.txt; pp. 1-58.

Richardson et al., "Virtual Network Computing," IEEE Internet Computing, vol. 2, No. 1, title page plus pp. 33-38, Jan.-Feb. 1998.

M. Day et al., "A Model for Presence and Instant Messaging," RFC 2778, The Internet Society, 17 pages, Feb. 2000.

S. Blake et al., "An Architecture for Differentiated Services," RFC 2475, The Internet Society, 36 pages, Dec. 1998.

E. Crawley et al., "A Framework for QoS-Based Routing in the Internet," RFC 2386, The Internet Society, 31 pages, Aug. 1998.

RealVNC, "About RealVNC," RealVNC Ltd., 2 pages, Jan. 2002.

Nortel Networks, "Eliminating Boundaries," www.nortelnetworks.com, pp. 1-10, Apr. 16, 2004.

www.webopedia.com, "firewall" definition, 2 pages, Aug. 26, 2004.

www.webopedia.com, "virtual network computing" definition, 1 page, Apr. 27, 2007.

PCT Search Report for International Application No. PCT/US06/17331, Sep. 6, 2006.

Stolowitz Ford Cowger LLP, Listing of Related Cases, Jan. 10, 2010.

* cited by examiner

IDENTIFY A SECURE END-TO-END VOICE CALL

TECHNICAL FIELD

The present disclosure relates generally to identifying a secure end-to-end voice call.

BACKGROUND

Session Initiation Protocol (SIP) is a signaling protocol to set up and tear down a Voice Over Internet Protocol (VoIP) call. SIP messages do not actually carry voice packets. Instead, they contain control signals that create, modify, and terminate calls or sessions between one or more participants. A separate channel or path using the Real-time Transport Protocol (RTP) typically transports the voice packets. As VoIP deployments are increasingly popular, a need exists for secure VoIP calls that encrypt both the signaling message and the voice packets. VoIP devices use Transport Level Security (TLS) or Internet Protocol Security (IPSec) to secure signaling channels.

Internet Protocol (IP) phones typically include a display that indicates a call is secure. For example, a shield icon in Cisco IP telephones may indicate that a call is encrypted and, hence, secure. This shield icon, however, only indicates that the call or the media flowing to/from the local IP telephone is encrypted and does not necessarily indicate that the call is truly secure from an end-to-end perspective. For example, an IP phone may initiate a VoIP call that traverses securely through an IP-to-IP gateway. The voice call leaves the IP-to-IP gateway and arrives at an unsecured Public Switched Telephone Network (PSTN), where the voice call is decrypted before reaching the destination IP phone. The destination IP phone, however, may still flag the voice call as secure since the voice call traversed a secure last leg from the IP-to-IP gateway, after the PSTN, to the destination IP phone. For another example, a phone system may re-route a PSTN call through a VoIP network and vice versa. When this occurs, the VoIP call traverses the PSTN unencrypted, and thus not secure end-to-end. As with the former example, the destination IP phone may still flag the call as secure and perhaps display the shield icon because the last leg of the call is secure, even though the call is not secure from end-to-end.

BRIEF DESCRIPTION OF THE DRAWINGS

The above and other features and advantages of the embodiments will become readily apparent by reference to the following detailed description and the accompanying drawings.

DESCRIPTION OF EXAMPLE EMBODIMENTS

Overview

We describe a method embodiment comprising generating a Secure Real-Time Transport Protocol (SRTP) encapsulated packet and including a secure media indicator into the SRTP encapsulated packet. The method further comprises inserting the SRTP encapsulated packet into an SRTP voice stream associated with an active call between a source and a destination endpoint and indicating an end-to-end secure call between the source and destination endpoints responsive to the secure media indicator.

We describe a system embodiment comprising a source endpoint to generate an SRTP packet including a security indicator and to insert the SRTP packet into an SRTP voice packet stream. A destination endpoint is adapted to detect an end-to-end secure call between the destination and source endpoints responsive to the security indicator.

And we describe a method embodiment comprising transmitting a request message from a source endpoint to a destination endpoint participating in an active call and setting a secure media flag in the request message at each node in a signaling path associated with the active call. The method further comprises returning a response message from the destination endpoint to the source endpoint responsive to receiving the request at the destination endpoint and indicating an end-to-end secure call between the source and destination endpoints along the signaling path of the active call responsive to the secure media flag.

Description

Figure 1:
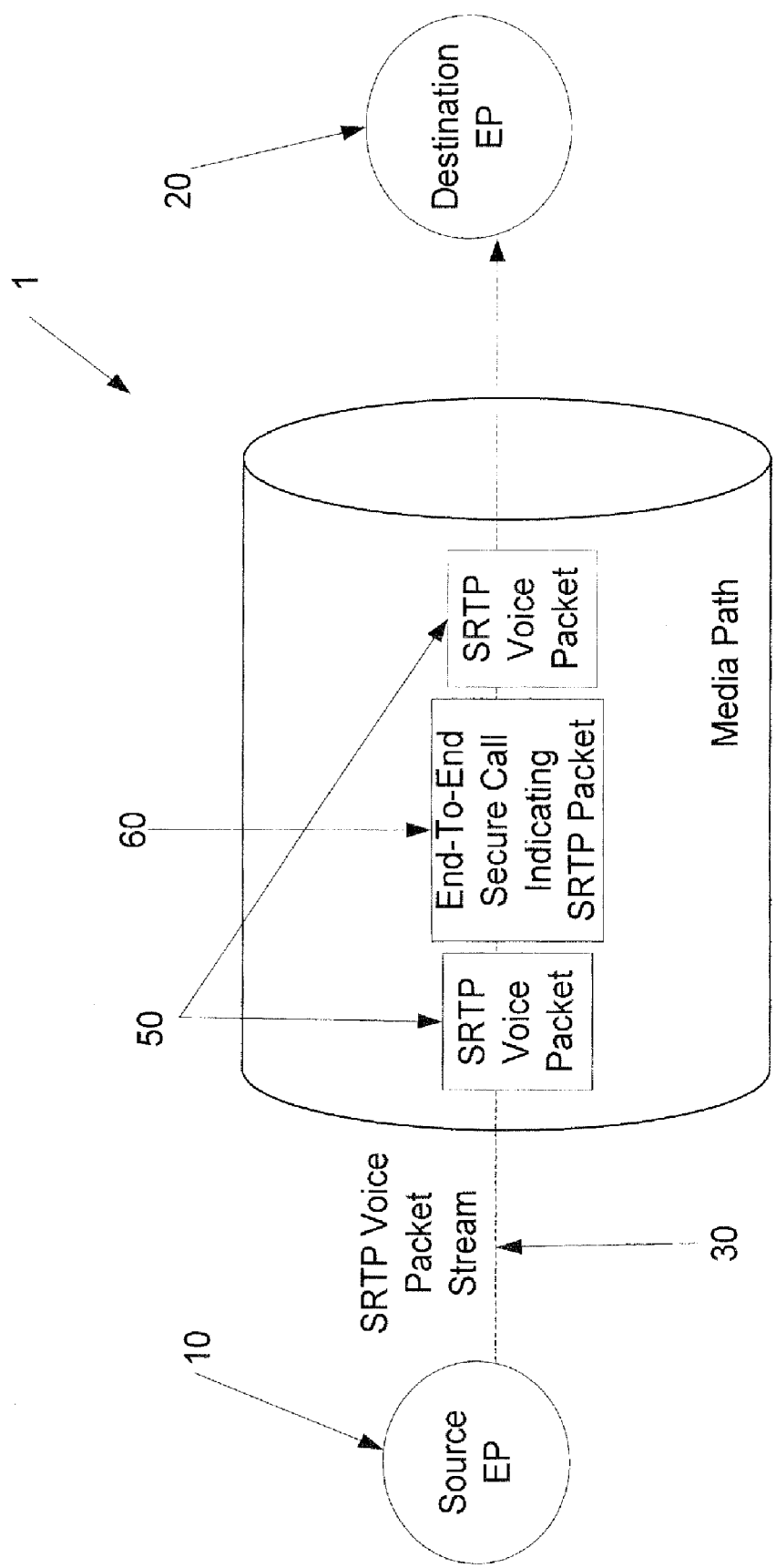
FIG. 1 is a schematic block diagram illustrating an example system for identifying end-to-end secure VoIP calls using in band mechanism.

FIG. 1 is a schematic block diagram illustrating an example system 1 for identifying end-to-end secure VoIP calls between a source endpoint EP 10 and a destination endpoint EP 20. EP 10 and EP 20 may be IP phones, landline telephones with IP capability, or any other communication device capable of transmitting or receiving voice or audio information over an IP network. The source and destination endpoints EP 10 and EP 20 may be Cisco IP phones used with or without Cisco's Call Manager or Call Manager Express. In an embodiment, there is an active call between the source and destination endpoints EP 10 and EP 20, respectively, with a corresponding SRTP voice packet stream 30 associated with the active call flowing between them.

Referring to FIG. 1, source EP 10 generates an end-to-end secure call indicating SRTP encapsulated packet 60 as well as other SRTP voice packets 50. The source EP 10 inserts the SRTP packet 60 into the SRTP voice packet stream 30 that may already include one or more SRTP voice packets 50. The voice stream 30 may be associated with an active call between the source EP 10 and the destination EP 20. In an embodiment, the source EP 10 periodically inserts one or more SRTP packets 60 into the voice stream 30 to cover the situation when there is a mid-call media change, e.g., when a voice call is changed to a video call. The source EP 10 may encrypt the SRTP packet 60 in any manner known to a person of reasonable skill in the art.

The secure call indicating SRTP packet 60 may differ from the SRTP voice packets 50 by indicating whether the active call is end-to-end secure by, e.g., having a SECURE payload type 62 (FIG. 2), as we explain in more detail below. The SRTP packet 60 may carry information identifying a type 64 (FIG. 2) of the source EP 10, e.g., type 64 may indicate EP 10 is an IP phone and not a gateway or intermediate media termination point. And the SRTP packet 60 may include a key 66 (FIG. 2) used to encrypt the SRTP voice packet stream 30 at the source EP 10. In an embodiment, the SRTP encapsulated packet 60 will not propagate through a back-to-back voice gateway pair but rather traverse a media path. The media path may provide a direct phone-to-phone communication channel that is less vulnerable to interference by an intermediate device.

Figure 2:
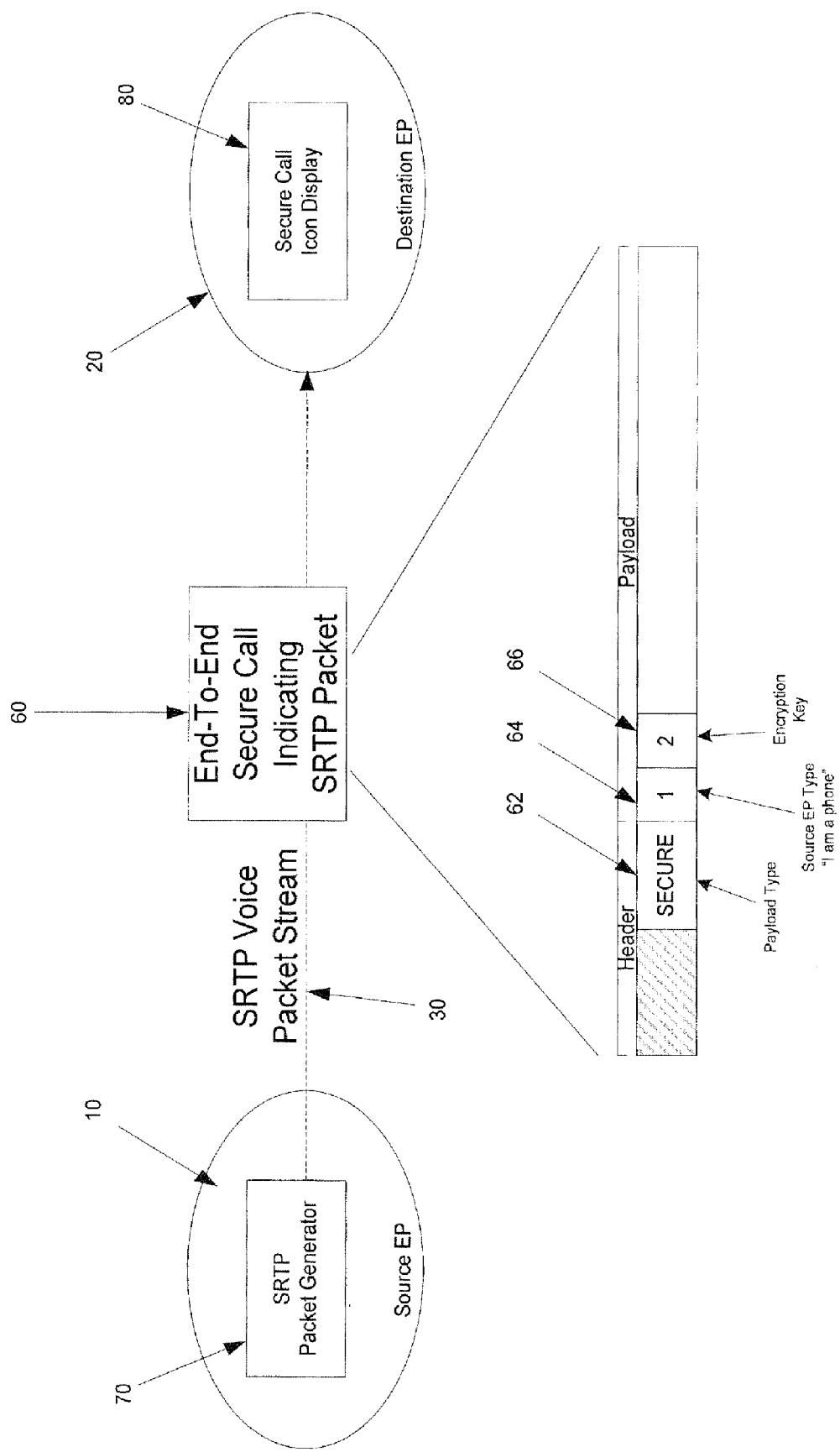
FIG. 2 is a schematic block diagram illustrating the system according to FIG. 1.

FIG. 2 is a schematic block diagram illustrating the system according to FIG. 1. Referring to FIG. 2, the source EP 10 includes an SRTP packet generator 70 to generate and insert the SRTP encapsulated packets 50 and 60 into the SRTP voice packet stream 30. The SRTP packet generator 70 may generate the SRTP packet 60 with a different payload type 62, e.g., a SECURE payload type, than other SRTP voice packets 50. In an embodiment, the SRTP packet 60 includes a header and a payload, where the header includes a payload type 62 set to SECURE. The payload of the SRTP packet 60 may identify the type 64 of the EP 10, e.g., the type 64 may identify the EP 10 as an IP phone. The payload of the SRTP packet 60 may additionally include an encryption key 66 to encrypt the SRTP voice packet stream 30 at the source EP 10. In an embodiment, the SRTP packet 60 may be formatted as defined by the Internet Engineering Task Force (IETF) in its RFC 2833.

In an embodiment, the secure call indicating SRTP packet 60 is signed with a digital certificate issued by a certificate authority that is common to both the source EP 10 and the destination EP 20. Alternatively, the SRTP packet 60 may be signed with a public Cisco certificate indicating the source EP 10 and/or the destination EP 20 is at least a Cisco IP phone.

The destination EP 20 receives the SRTP packet 60 sent by the source EP 10 as delivered in the voice stream 30. The destination EP 20 determines the call secure end-to-end by decoding (i.e., decrypting) and validating the SRTP packet 60 by, e.g., reading the payload type 62 and/or determining the type 64 of the source EP 10. In one embodiment, the destination EP 20 indicates the call secure end-to-end, i.e., that the destination EP 20 is connected to a secure source EP 10 and that every leg in the call is encrypted, responsive to the SRTP packet 60. This is possible because the SRTP packet 60 will pass through an SRTP path and will be dropped through a non-secure path, e.g., a path through an unsecured PSTN. In an embodiment, the destination EP 20 determines the call secure end-to-end by determining the encrypted call is terminated on a secure source EP 20, e.g., an IP phone, as opposed to the call being routed via some other non-secure intermediate device such as a PSTN gateway. The destination EP 20 may indicate the call secure end-to-end by, e.g., displaying a secure call icon 80 on its display (not shown). This indication serves to remove a user's ambiguity regarding a secure destination EP 20 being connected to a secure source EP 10 through a secure SRTP path.

Figure 3:
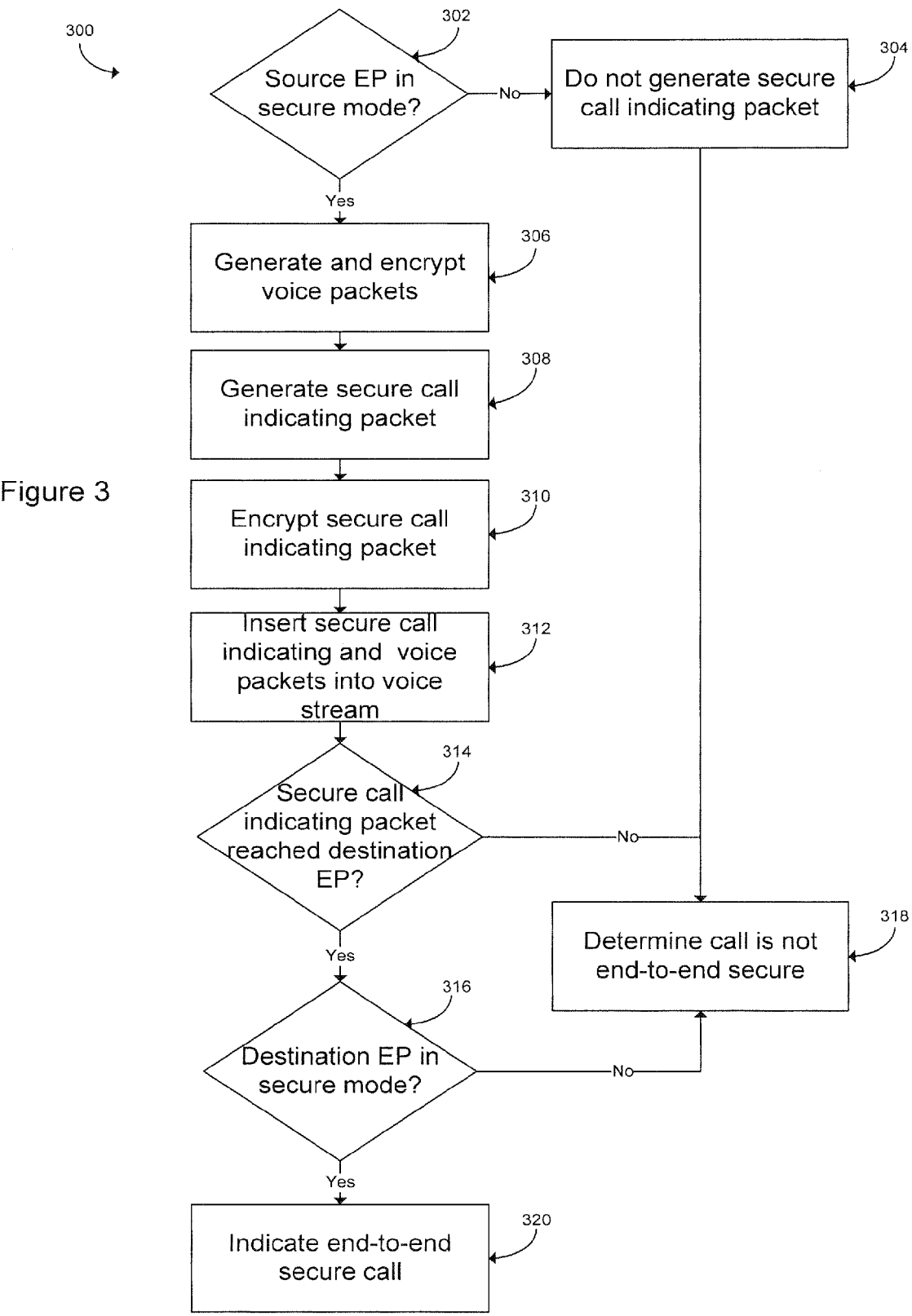
FIG. 3 is a flow chart illustrating of an example method for identifying end-to-end secure VoIP calls.

FIG. 3 is a flow chart illustrating of an example method 300 for identifying end-to-end secure VoIP calls. The method 300 determines at 302 whether the source EP 10 is operating in a secure mode, i.e., whether the source EP 10 is encrypting voice packets 50 and secure call indicating SRTP packets 60 before placing them in the voice stream 30. If the source EP 10 is not operating in a secure mode, the source EP 10 does not generate a secure call indicating packet 60 at 304 and the destination EP 20 determines the call is not secure end-to-end at 318. It should be apparent to one ordinary skilled in the art that a call must be end-to-end secure, without non-secure segments, for the SRTP encapsulated packet to reach the destination EP 20. Where at least one leg of the call is not secure, the system 1 will drop the SRTP packet 60.

If the source EP 10 is operating in a secure mode, it generates and encrypts voice packets 50 before placing them in the voice stream 30 at 306. And the source EP 10 generates a secure call indicating packet 60 at 308. In an embodiment, the secure call indicating packet 60, as the name implies, includes an indication that the call is end-to-end secure by, e.g., having a secure payload type 62 (FIG. 2). The secure call indicating packet 60 may also include information identifying the type 64 (FIG. 2) of the source EP 10 as well as an encryption key 66 the source EP 10 used to encrypt the voice stream 30. The source EP 10 encrypts the secure call indicating packet at 310 using any kind of encryption known to a person of reasonable skill in the art. The source EP 10 may include the encryption key 66 in a payload of the secure call indicating packet 60. At 312, the source EP 10 inserts the secure call indicating packet 60 and the voice packets 50 into the voice stream 30. In an embodiment, the source EP 10 periodically inserts one or more secure call indicating packets 60 into the voice stream 30. The source EP 10 may periodically insert the secure call indicating packets 60 using any convenient time period.

At 314, the method 300 determines if the secure call indicating packet 60 reached the destination EP 20. If it did not, the destination EP 20 determines the call is not end-to-end secure at 318. If the secure call indicating packet 60 reached the destination EP 20, the method 300 determines if the destination EP 20 is operating in a secure mode, e.g., by receiving and/or generating encrypted packets on the voice stream 30. If the destination endpoint EP 20 is not operating in a secure mode, the destination EP 20 determines the call is not end-to-end secure at 318. If the destination EP 20 is operating in a secure mode, the destination EP 20 indicates the call end-to-end secure at 320. In an embodiment, the destination EP 20 indicates the call is end-to-end secure by generating and displaying a security icon on, e.g., a display of the destination EP 20. A person of reasonable skill in the art should realize that the destination EP 20 may indicate the call end-to-end secure using a variety of well known means, including sound, light, text, and the like.

Referring back to FIG. 1, in an embodiment, the source EP 10 and the destination EP 20 may be modified to carry out the method 300 shown in FIG. 3. The source EP 10 may have an output port configured to generate and/or insert—or periodically insert—the secure call indicating packet 60, including a secure payload type 62, into the SRTP voice stream 30 associated with an active call between the source EP 10 and the destination EP 20. The destination EP 20 may have an input port configured to receive the secure call indicating packet 60. Both the source and destination EPs 10 and 20 may each have a specially configured input and output ports to either generate or receive the secure call indicating packet 60. In an embodiment, the source and destination EPs 10 and 20 are configured to indicate an end-to-end secure call by, e.g., displaying respective secure call icons.

Figure 4:
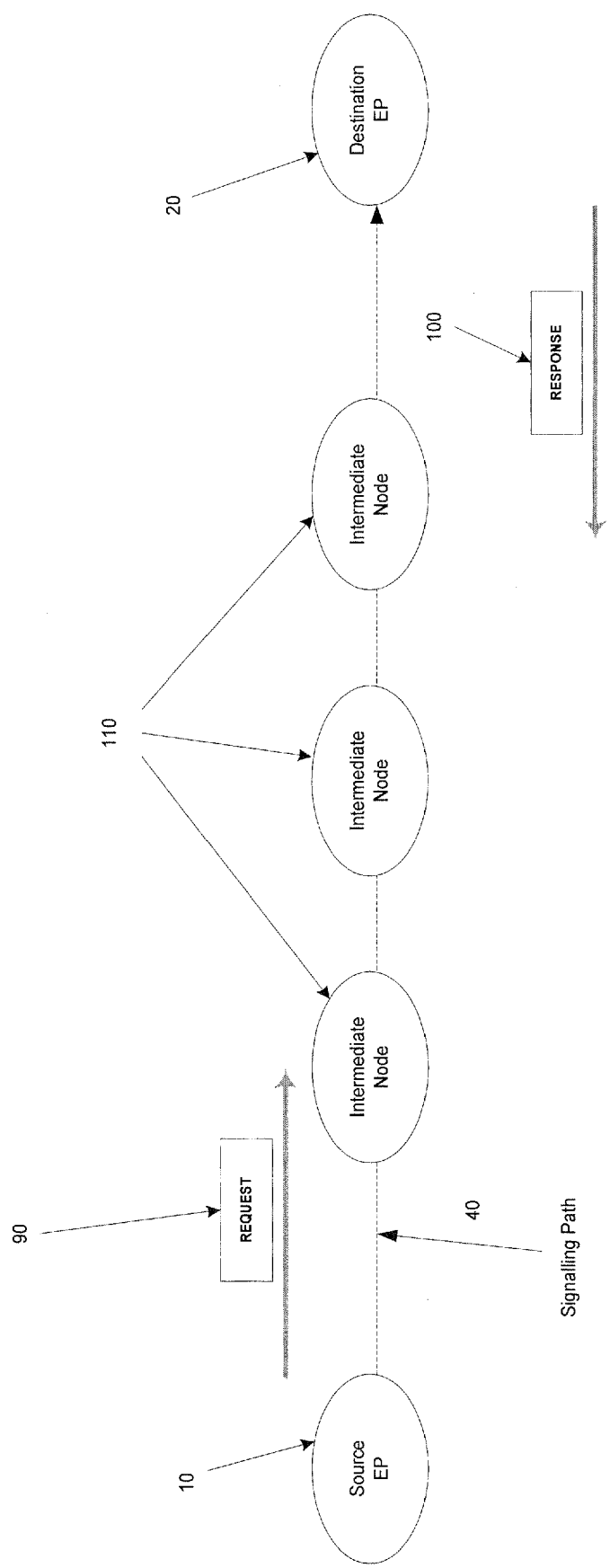
FIG. 4 is a schematic block diagram illustrating an example system for identifying end-to-end secure VoIP calls using out of band mechanism.

FIG. 4 is a schematic block diagram illustrating an example system for identifying end-to-end secure VoIP calls using out of band signaling such as using OPTIONS method provided as part of SIP protocol. Referring to FIG. 4, a plurality of intermediate nodes 110 are positioned along the signaling path 40 between the source EP 10 and the destination EP 20. Each intermediate node may be e.g., a switch configured to connect multiple network segments at full wire speed. The intermediate nodes 110 may alternatively be any device capable of receiving, verifying, and/or forwarding packetized data. A difference between the example embodiment shown in FIGS. 1 and 4 is that former uses the voice stream 30 in the media path to transport the end-to-end secure call indicating SRTP packet 60 while the latter uses the signaling path 40 to transport the request message 90.

The source EP 10 sends a request message 90 along the signaling path 40 associated with a call between the source EP 10 and the destination EP 20. The request message 90 is a call signaling message sent through the signaling path 40 on a call between the source and destination EPs 10 and 20. The request message 90 may contain several fields for setting several associated flags. The request message 90 may include a secure media field for setting a secure media flag. Initially, the source EP 10 sets (e.g., true) or clears (e.g., false) the secure media flag 140 to indicate whether it operates in a secure mode, i.e., whether it is generating encrypted voice packets. The flag 140 may also indicate whether the particular segment of the call between the source and destination EPs 10 and 20 is secure for both the signaling path 40 and the media path (not shown) that transports the voice packets associated with the call. In an embodiment, the request message 90 may indicate whether each leg is secure, thus indicating whether the call is end-to-end secure after having end-to-end traversed the path between the source EP 10 and the destination EP 20.

Each intermediate node 110 receives the request message 90 and updates the secure media field by setting the secure media flag responsive to whether the segment is secure for both the signaling path 40 and the media path (not shown). The destination EP 20 receives and decodes the request message 90. The destination EP 20 transmits a response message 100 back to the source EP 10. The response message 100 may also include a secure media field with an associated media flag that indicates whether each segment of the call between the source and destination EPs 10 and 20 is secure as we explain in more detail below.

Figure 5:
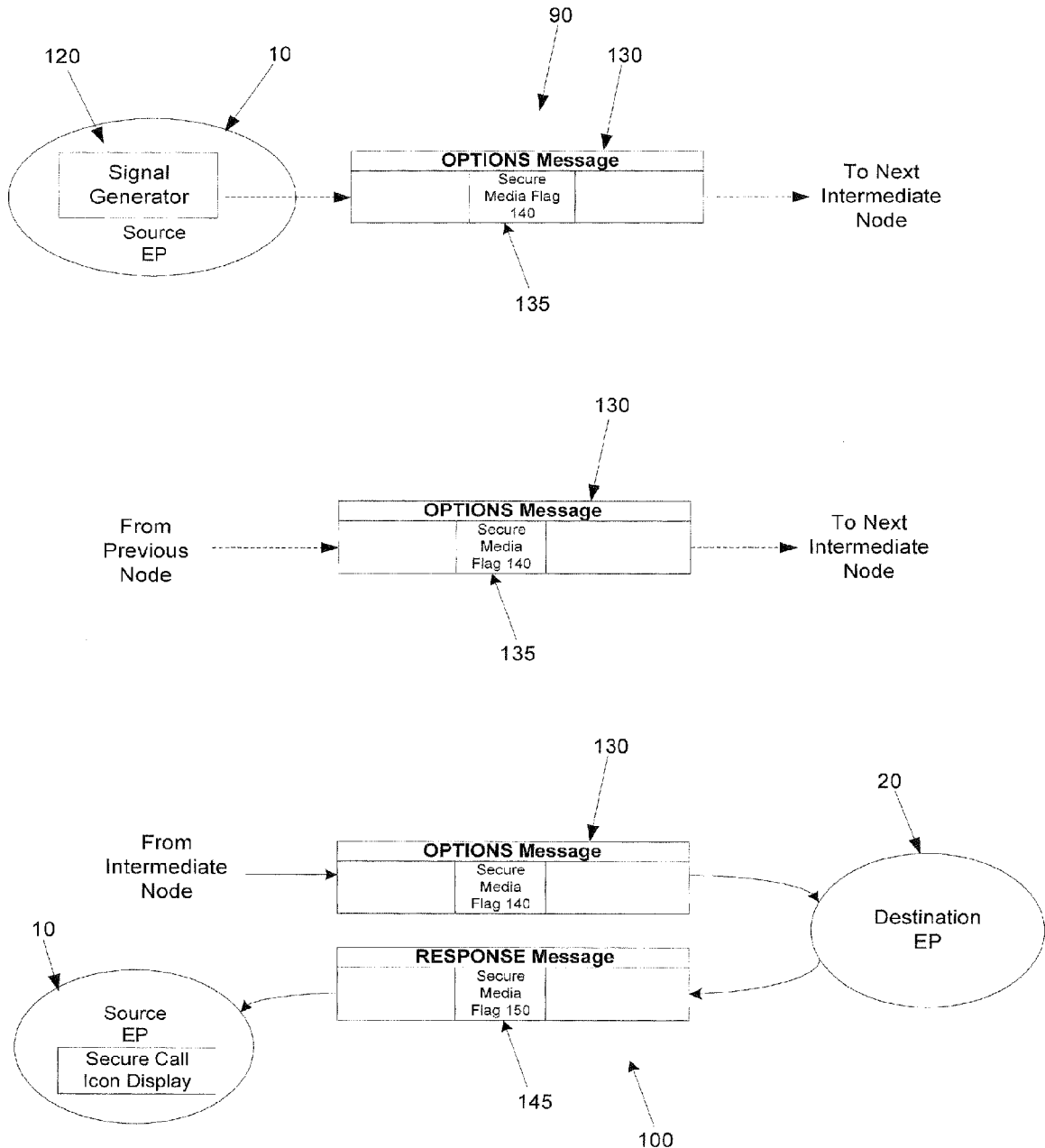
FIG. 5 is a schematic diagram illustrating an example communication for the system shown in FIG. 4.

FIG. 5 is a schematic diagram illustrating an example communication for the system shown in FIG. 4. Referring to FIGS. 4 and 5, a signal generator 120 in the source EP 10 generates the request message 90. In an embodiment, the request message 90 may be an SIP OPTIONS message 130 with an additional secure media field 135 for setting an associated secure media flag 140 that indicates whether the node is secure for both signaling and data.

The OPTIONS message 130 is sent from one intermediate node 110 to the next, until it reaches the destination EP 20. The next intermediate node 110 receives and updates the secure media flag 140 to indicate whether the particular segment is secure for both the signaling path and the media path. Once the OPTIONS message 130 arrives at the destination EP 20, it sends a response message 100 back to the source EP 10. The response message 100 may also be an OPTIONS message 130 with an additional secure media field 145 and an associated secure media flag 150 to indicate whether each segment of the call between the destination and source EPs 20 and 10 is secure. In an embodiment, each node in the path between the source EP 10 and the destination EP 20 updates the secure media flag 140 to indicate whether each leg is secure for both the signaling and media path. Similarly, each node in the path between the destination EP 20 and the source EP 10 may update the secure media flag 150 to indicate whether each leg is secure for both signaling and media path. In an embodiment, the source EP 10 (or the destination EP 20) may indicate the call is end-to-end secure responsive to the secure call media field 145 by a variety of manners, including displaying a secure call icon on a display of the EP 10 or by sound, light, text, and the like.

Figure 6:
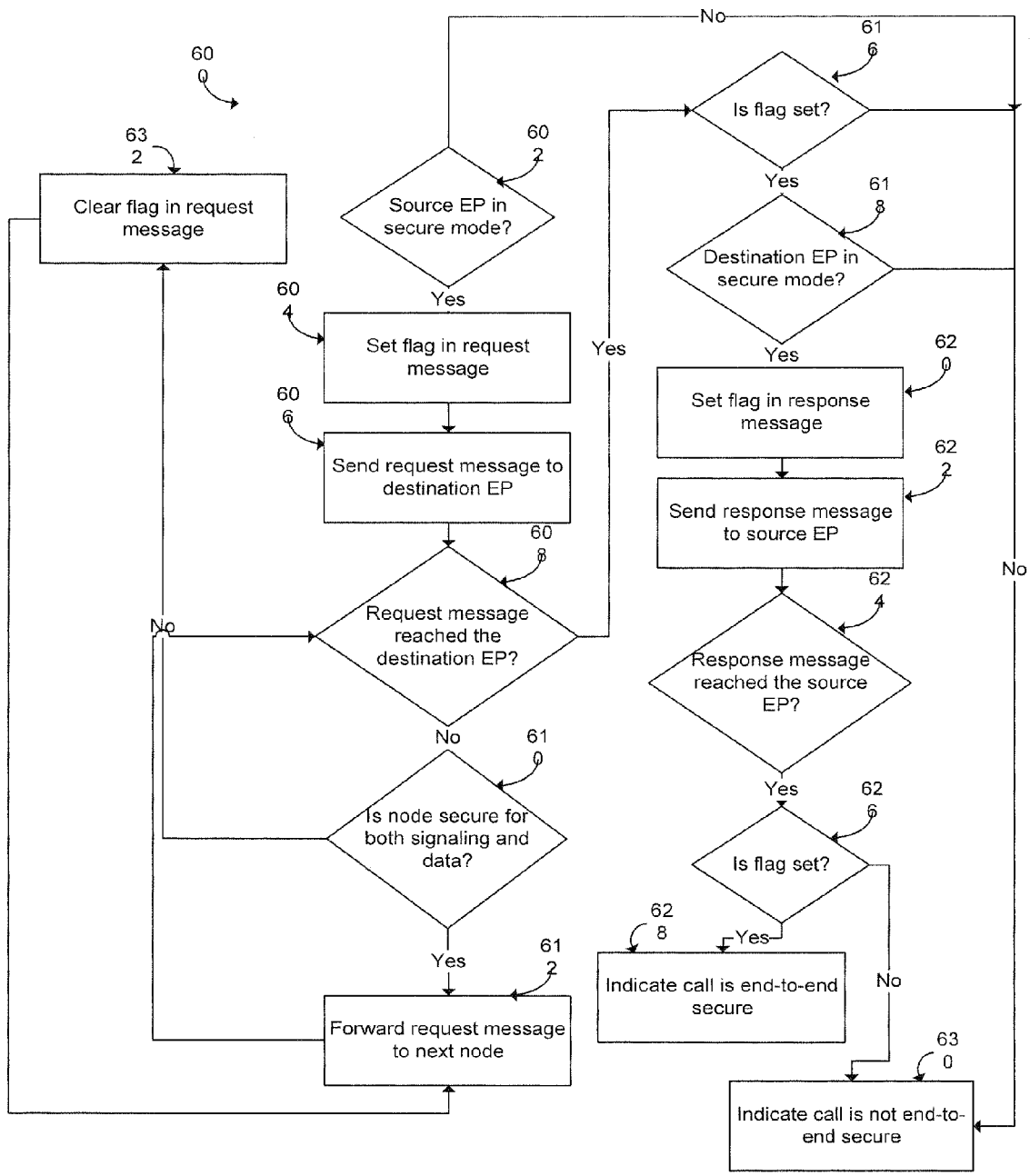
FIG. 6 is a flow chart illustrating an example method for identifying end-to-end secure VoIP calls.

FIG. 6 is a flow chart illustrating an example method for identifying end-to-end secure VoIP calls. Referring to FIG. 6, the method 600 determines whether the source EP 10 is in a secure mode at 602, e.g., by being configures to support secure communications.

If the source EP 10 is not secure, the method 600 indicates the call is not end-to-end secure at 630. If the source EP 10 is in a secure mode, on the other hand, the method 600 generates the request message 90 at 604.

In an embodiment, the request message 90 is an OPTIONS message 130 with a secure media field 135 and a secure media flag 140. The secure media flag 140 may indicate whether the node or path between the source and destination EPs 10 and 20 are operating in a secure mode, e.g., by encrypting packets.

In an embodiment, the source EP 10 may generate the request message 90 during call establishment or after the call is established between the source and destination EPs 10 and 20. And the source EP 10 may generate the request message 90 periodically along with an existing options refresh when a mid-call media change occurs, such as when a supplementary service is invoked. By using the initial call establishment and the existing refresh mechanism, the method 600 avoids any additional load on the network and its associated devices.

At 606, the method 600 sends or transmits the message 90 to the destination EP 20 through at least one and possibly several intermediate nodes 110.

At 608, the method 600 determines whether the request message 90 reached the destination EP 20. If the message 90 has not reached the destination EP 20 and instead reached an intermediate node 110, the method 600 determines whether the intermediate node 110 is secure for both signaling and data at 610. If the node 110 is secure, the method 600 forwards the request message 90 with the flag 140 set to the next intermediate node 110 (or to the destination node EP 20) at 612. If, on the other hand, the intermediate node 110 is not secure for signaling and data, the method 600 clears the flag 140 at 632 and forwards the request message 90, with flag 140 cleared, to the next intermediate node 110 (or to the destination EP 20) at 612.

In an embodiment, an intermediate node 110 may be a gateway having signaling and media legs or paths. The signaling leg may further include incoming and outgoing signaling legs. If the intermediate node 110 has secure signaling on both the incoming and outgoing legs, but does not have secure media, in either one or all legs, the node 110 will clear the flag 140 at 632. If the intermediate node 110 has secure signaling on one but not both legs, the node 110 will clear the flag 140 at 632 regardless of the media legs. And so on.

If the request message 90 has reached the destination EP 20 (at 608), the method 600 determines whether the flag 140 is set at 616. If the flag 140 is set and the destination EP 20 is secure for signaling and data (at 618), the method 600 generates a response message 100 including setting a secure call flag 150 (at 620) in the secure call media field 145. The secure media flag 150 may indicate whether the node or path between the source and destination EPs 10 and 20 are operating in a secure mode, e.g., by encrypting packets. The method 600 sends or transmits the response message 100 to the source EP 10 at 622. Once the response message 100 reaches the source EP 10 (at 624), the method 600 determines whether the flag 150 is set (at 626). If the flag 150 is set, the method 600 indicates the call is end-to-end secure 628. The source EP 10 may indicate the call is secure by, e.g., displaying a secure call icon. If the flag 150 is clear at 626, the method 600 indicates the call is not end-to-end secure at 630.

In an embodiment, the destination EP 20 may initiate a request message 90 and send it to the source EP 10. The request message 90 may collect end-to-end secure media information for the path from the destination EP 20 to the source EP 10. In return, the source EP 10 may send a response message 100 to the destination EP 20 that will indicate by, e.g., displaying a secure call icon, whether the call is end-to-end secure.

The following is an example of an end-to-end secure media call between a secure IP phone A and a secure IP phone B along a path including first intermediate node CM1, secure IP node SIP, and second intermediate node CM2. As shown in the example, the secure media flag is updated and sent back to the requester, IP phone A, which can indicate the call end-to-end secure by, e.g., displaying a secure call icon.

```
Sent:
OPTIONS sip:biloxi.example.com:5060 SIP/2.0
Via: SIP/2.0/UDP 15.6.39.10:5060;branch=z9hG4bKDC26C5
From: <sip:15.6.39.10>;tag=575C948-1075
To: <sip:xyz.project.com>
Call-ID: 896B3814-66B911D6-81D6A8CE-F69B146A@15.6.39.10
CSeq: 101 OPTIONS
Max-Forwards: 70
Contact: <sip:15.6.39.10:5060>
Secure media flag: TRUE
Content-Type: text/plain
Content-Length: xxx
Received:
SIP/2.0 200 OK
Via: SIP/2.0/UDP 15.6.39.10:5060;branch=z9hG4bKDC26C5
From: <sip:15.6.39.10>;tag=575C948-1075
To: <sip:xyz.project.com>;tag=67895634-1234
Call-ID: 896B3814-66B911D6-81D6A8CE-F69B146A@15.6.39.10
CSeq: 101 OPTIONS
Contact: <sip:15.6.39.10:5060>
Secure media flag: TRUE
Content-Type: text/plain
Content-Length: 0
```

The following is an example of an end-to-end non-secure media call between a secure IP phone A and a PSTN phone B along a path including first intermediate node CM1, secure IP node SIP, and gateway GW. As shown in the example, the secure media flag is updated and sent back to the requester, IP phone A. The IP phone A may indicate the call to be non-secure end-to-end by, e.g., not displaying a secure call icon.

```
Sent:
OPTIONS sip:biloxi.example.com:5060 SIP/2.0
Via: SIP/2.0/UDP 15.6.39.10:5060;branch=z9hG4bKDC26C5
From: <sip:15.6.39.10>;tag=575C948-1075
To: <sip:xyz.project.com>
Call-ID: 896B3814-66B911D6-81D6A8CE-F69B146A@15.6.39.10
CSeq: 101 OPTIONS
Max-Forwards: 70
Contact: <sip:15.6.39.10:5060>
Secure media flag: TRUE
Content-Type: text/plain
Content-Length: xxx
Received:
SIP/2.0 200 OK
Via: SIP/2.0/UDP 15.6.39.10:5060;branch=z9hG4bKDC26C5
From: <sip:15.6.39.10>;tag=575C948-1075
To: <sip:xyz.project.com>;tag=67895634-1234
Call-ID: 896B3814-66B911D6-81D6A8CE-F69B146A@15.6.39.10
CSeq: 101 OPTIONS
Contact: <sip:15.6.39.10:5060>
Secure media flag: FALSE
Content-Type: text/plain
Content-Length: 0
```

It should be apparent that a person skilled in the art can make modifications and variations to the example embodiments we describe above. Any such modifications and variations come within the scope and spirit of the claims.

The invention claimed is:

1. A method, comprising:
   transmitting, from a source endpoint, a request message addressed to a destination endpoint participating in an active call, wherein the request message is transmitted over a path that extends through at least one intermediary node;
   wherein the transmitted request message includes a setting configured to cause each intermediary node on the path to set a secure media flag in the request message according to whether such intermediary node operates in a secure mode;
   receiving back a response message at the source endpoint identifying the secure media flag settings performed by the at least one intermediary node; and
   indicating an end-to-end secure call between the source and destination endpoints of the active call according to the response message.

2. The method of claim 1, comprising transmitting the request message during one of initial call establishment, mid-call, or after call establishment.

3. The method of claim 1, wherein the request and response messages traverse a signaling path associated with the active call.

4. The method of claim 1, wherein indicating the end-to-end secure call includes enabling a secure call icon in the source or destination endpoints if the secure media flag indicates no non-secure segment in a signaling path between the source and destination endpoints.

5. Software encoded on one or more non-transitory computer-readable media and when executed operable to:
   transmit, from a source endpoint, a request message addressed to a destination endpoint participating in an active call, wherein the request message is transmitted over a path that extends through at least one intermediary node;
   wherein the transmitted request message includes a setting configured to cause each intermediary node on the path to set a secure media flag in the request message according to whether such intermediary node operates in a secure mode;
   receive back a response message at the source endpoint identifying the secure media flag settings performed by the at least one intermediary node; and
   indicate an end-to-end secure call between the source and destination endpoints of the active call according to the response message.

6. The software encoded on the one or more non-transitory computer-readable media of claim 5, wherein the software encoded on the one or more non-transitory computer-readable media when executed is further operable to display a secure call icon according to the response message.

7. The software encoded on the one or more non-transitory computer-readable media of claim 5, wherein the request and response messages traverse a signaling path associated with the active call.

8. The software encoded on the one or more non-transitory computer-readable media of claim 5, wherein the indication is by enabling a secure call icon in the source or destination endpoints if the secure media flag indicates no non-secure segment in a signaling path between the source and destination endpoints.

9. The software encoded on the one or more non-transitory computer-readable media of claim 5, wherein the request and the response messages are sent according to the Session Initiation Protocol (SIP).

* * * * *